United States Patent [19]

Buckley

[11] 4,418,954
[45] Dec. 6, 1983

[54] FOLDABLE COVER FOR A TRUCK BED

[76] Inventor: John A. Buckley, 74 Hillside Rd., Sparta, N.J. 07877

[21] Appl. No.: 350,732

[22] Filed: Feb. 22, 1982

Related U.S. Application Data

[63] Continuation-in-part of Ser. No. 172,995, Jul. 28, 1980, abandoned.

[51] Int. Cl.³ ............................................. B60P 7/02
[52] U.S. Cl. ................................................. 296/100
[58] Field of Search ....................... 296/100, 210, 219

[56] References Cited

U.S. PATENT DOCUMENTS

| | | | |
|---|---|---|---|
| 2,086,091 | 7/1937 | Payette | 296/100 |
| 2,602,693 | 7/1952 | Murphy | 296/100 |
| 3,342,523 | 9/1967 | Lutgen | 296/100 |
| 3,649,072 | 3/1972 | Cross | 296/100 |
| 3,820,840 | 6/1974 | Forsberg | 296/100 |
| 4,199,188 | 4/1980 | Albrecht et al. | 296/100 |
| 4,277,098 | 7/1981 | Gibney | 296/100 |
| 4,313,636 | 2/1982 | Deeds | 296/100 |

FOREIGN PATENT DOCUMENTS 233413  5/1964  Austria .............................. 296/100

Primary Examiner—Joseph F. Peters, Jr.
Assistant Examiner—Ross Weaver
Attorney, Agent, or Firm—Ronald G. Goebel

[57] ABSTRACT

A foldable cover for a truck bed is provided comprising a pair of support members mounted above the bed on the vehicle bed walls, a rear cover member enclosing the rear section of the bed, a first central cover panel lying across the support members pivotably connected to the rear panel, a second central cover member lying across the support members pivotably connected to said first central cover panel and a forward cover member extending across said bed pivotably connected to said second central cover panel.

8 Claims, 7 Drawing Figures

FOLDABLE COVER FOR A TRUCK BED

This is a continuation in part of application Ser. No. 172,995, filed July 28, 1980, now abandoned.

BACKGROUND OF THE INVENTION

This invention relates to a foldable cover for a tuck bed such as a pick-up truck bed.

In the past covers for a truck box or bed have been described in the art comprising one or more panels designed to fold, slide or telescope into remaining portions of the cover.

For example, in U.S. Pat. No. 3,768,858 to A. G. J. Boismier, a truck box cover is provided capable of being completely folded away or used for other purposes. The cover comprises four panels arranged in pairs of outer panels and inner panels. Each outer panel is provided with a hinge mounted on the top edge of a side wall of the pick-up box. Each inner panel is secured to the corresponding outer panel by a second hinge. The first hinge makes it possible to turn an outer panel 270° to a vertical position outside the truck box. The second hinge makes it possible to pivot an inner panel 180° with respect to a corresponding outer panel. In another embodiment of the invention the cover can be used as a load binder.

In U.S. Pat. No. 2,086,091 to P. Payette a vehicle body having a removable cover is described which may be fastened and sealed in the closed position. The cover has downwardly curved side walls having rim portions on their inner edges to form a cover receiving groove. An end gate is pivotably connected to the vehicle body by means of pivot pins. The removable cover comprises four sections extending from the top of the body to the end gate. The top section is pivotably connected to the top rim of the body and this top section is pivotably connected to the next adjacent section and the other sections are pivotably connected to each other. A fastening bar is used to swing over the end gate and engage the last rear section of the cover for locking. To remove the cover the fastening bar is disengaged and the rearward cover section is swung upwardly and moved laterally to disengage its pivot pins. The next two cover sections are similarly removed and the top cover section is swung forwardly. In a modification, the cover sections are hingedly connected to each other to allow folding of each section forwardly.

In U.S. Pat. No. 3,765,717 to C. F. Garvert there is provided a cover for a pick-up truck mounted over the box comprising two panels, each panel having two hinged doors which doors allow access to the box when the panels are closed. The panels themselves are hingedly mounted on a frame inside the box to allow vertical positioning of the panels.

U.S. Pat. No. 3,649,072 to F. R. Cross relates to a telescoping cover for the box of a pick-up truck comprising a series of interlocking rectangular panels moveable within tracks formed in the sides of the truck bed and capable of being moved forwardly into a stacked relationship. U.S. Pat. No. 3,342,523 also shows a telescoping cover for a pick-up truck.

The present invention provides a foldable cover for a vehicle bed, particularly, a pick-up truck bed which, in one embodiment employs hingedly connected flat panels and a forward cover member arranged in a series extending across the length of the truck bed wherein no panel or cover member is secured to the frame of the vehicle and which cover does not entail the sliding or telescoping of any of its members. In another embodiment of the invention a foldable cover is provided which employs matching rear and forward cover members hingedly connected to central flat panels. By virtue of the foldable cover of the invention, it is possible to gain access to sections of the bed without uncovering the remaining sections, thereby making it convenient and well as ideal for unloading or loading articles from or to the bed in bad weather.

SUMMARY OF THE INVENTION

The present invention provides a foldable cover assembly for a vehicle having a top open bed enclosed by a pair of vehicle side walls and an end wall such as a tailgate. In one embodiment the cover assembly comprises a pair of support members mounted lengthwise above the vehicle walls along the rear and central portions of the bed and a pair of central cover panels and a rear cover member are disposed across the support members. The rear cover member has a vertically extending end wall which encloses the rear portion of the bed, that is the space between the vehicle end wall and support member. The pair of central cover panels are disposed across the support members adjacent the rear cover member pivotably connected to each other with the rearward central cover panel also pivotably connected to the rear cover member. A forward cover member having a top wall, pair of side walls and an end wall is pivotably connected to the forward central cover panel and enclosed the forward section of the bed. Means for locking the forward cover member and rear cover member to the vehicle are also provided.

In another embodiment of the invention the support members are mounted only above the central portion of the vehicle walls and support a pair of hingedly connected central cover panels. The rear cover member is constructed like the forward cover member described above; that is with a pair of side walls and an end wall and is pivotably connected with the rearward cover panel.

Access to the rear section of the bed is obtained by merely pivoting the rear cover member onto the rearward central cover panel. Access to the central and rear sections of the bed is gained by folding a combination of the rear cover member and central cover panels onto the forward cover member. To gain access to the forward section of the bed, the central cover panels and rear cover member are placed in the closed position and the forward cover member is merely pivoted over the forward central cover panel.

DETAILED DESCRIPTION OF THE PREFERRED EMBODIMENTS

Figure 1:
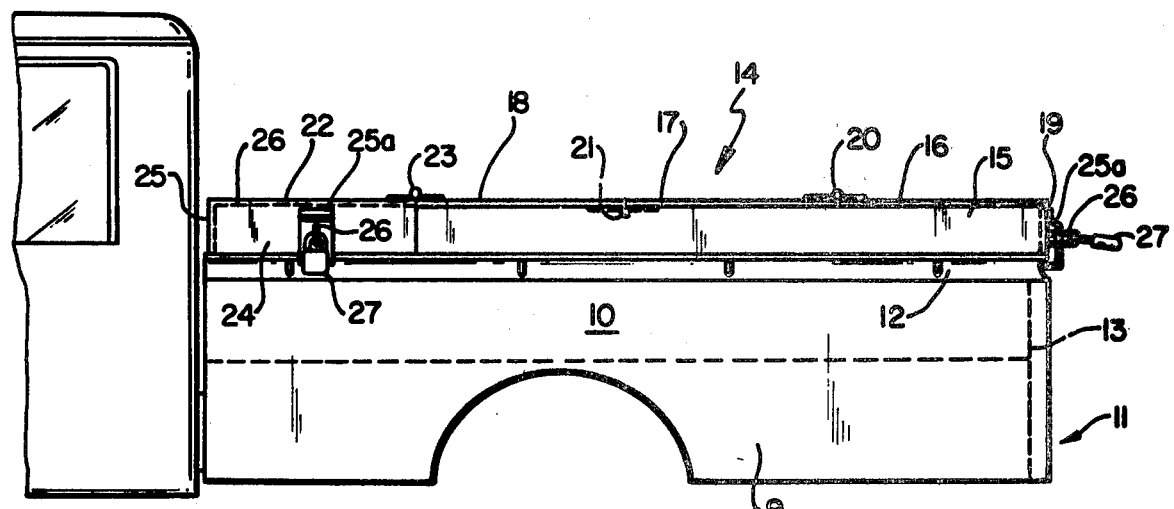
FIG. 1 shows a side view of one foldable cover of the invention mounted on the bed of a pick-up truck.

FIG. 1 shows the truck bed cover of this invention mounted on the flat open bed 10 of pick-up truck 11 having vertical side walls 9 and a rail section 12 located on both sides of the bed 10 above the side walls. A tailgate 13 is hingedly connected to the rear of the truck for gaining access to the bed.

The truck bed cover, shown generally by 14, comprises a pair of vertical support members 15 mounted atop the rail section 12 on each side of the truck bed extending from the rear of the bed forward about three fourths of the length of the bed. In trucks having no rail section the support members are mounted on the vertical side wall of the vehicle.

Lying on the support members 15 across the width of the truck bed are a rear cover member 16, first central cover panel 17, and second central cover panel 18. Rear cover member 16 includes rear vertical end wall 19 the inside face of which abuts the rearward edges of support members 15 to enclose the rearward portion of the truck bed. Rear cover member 16 is hingedly connected to first central panel 17 by means of rearward top hinge 20. Panel 17 is pivotally connected to second central cover panel 18 by central lower hinge 21. A forward cover member 22 is pivotably connected to cover panel 18 by means of forward top hinge 23. Forward cover member 22 is a hollow box-like member having a pair of side walls 24, forward vertical end wall 25 and top wall 26. Forward cover member 22 provides a forward enclosure of the truck bed, with the rearward edges of said side walls 24 abutting the forward edges of support member 15 and providing a forward extension of support members 15 and end wall 25 enclosing the forward end of the truck bed. The flat cover panels and cover members 16 & 22 divide the bed into three sections; a rear section overlied by the rear cover panel 16, a central section overlied by the first and second central panels 17 & 18; and a forward section overlied by the forward cover member 22.

In order to prevent unwarranted access to the bed, and to prevent uplifting of the cover by air forces, means for locking the cover may be provided at the forward cover member 22 and rear cover member 16. Such means for locking may consist of a pivotable L-shaped latch 25a on said rear cover member and forward cover member which engages the edge portion of the tailgate 13 and rail section 12, respectively. Each L-shaped latch has an opening through which an eye 26a extends also mounted on the cover member. A padlock 27 can be inserted through each eye to lock the latch. To unlock each latch the padlock is removed and each latch is moved outwardly of the edge portion it engages and pivoted upwardly. The above locking means is given by way of example, it being understood that those skilled in the art may employ or develop other locking means for the cover members or for the central cover panels, if desired.

Operation of the truck bed cover of this invention can be described in connection with FIGS. 3 to 6.

Figure 3:
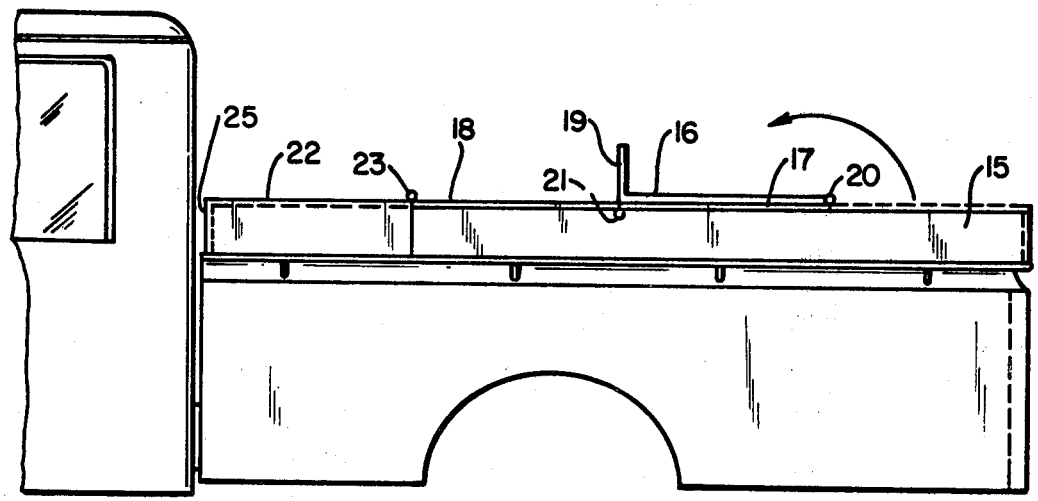
FIGS. 3 to 6 show the folding of the cover of FIGS. 1 & 2 to uncover the rear, central and forward section of the bed.
Figure 4:
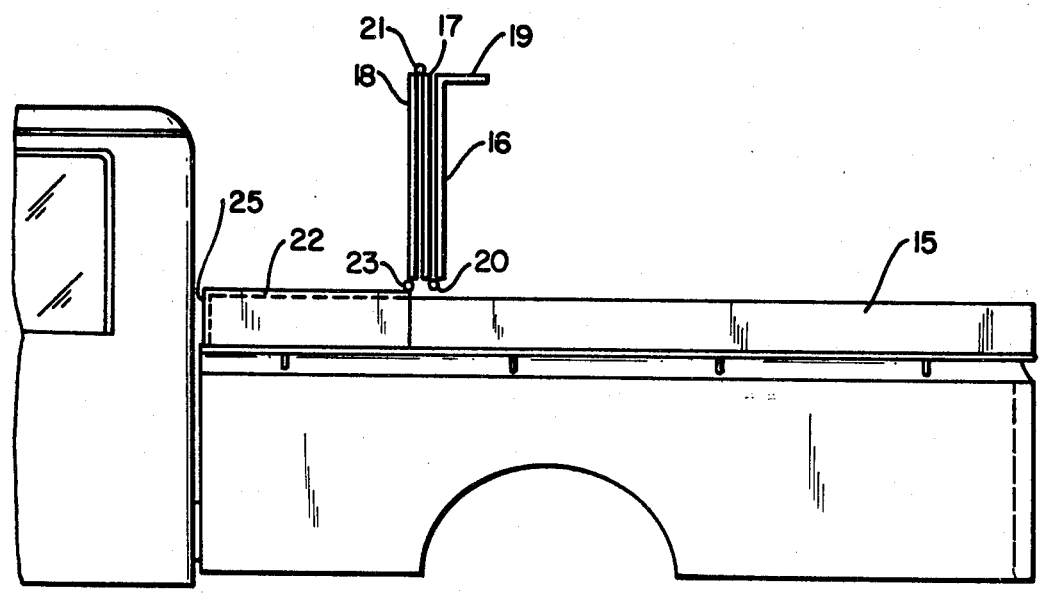
Figure 5:
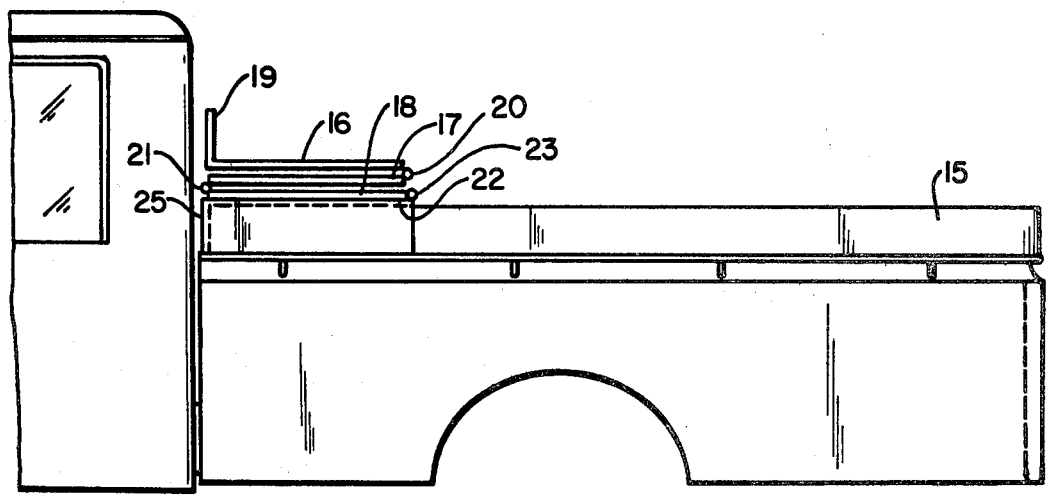

To gain access of the rearward portion of the bed, the cover member 16 is unlocked and cover member 16 is pivoted upwardly and forwardly over panel 17 as shown in FIG. 3 by the arrow. Further access to the central portion of the bed is accomplished by pivoting panel 18 upwardly about hinge 23 and pivoting cover member 16 and panel 17 in combination downwardly about hinge 21 to form a folded combination of member 16 and panels 17 & 18 as shown in FIG. 4 and then pivoting the folded combination downwardly and forwardly atop cover member 22 about hinge 23 to the position shown in FIG. 5.

Figure 6:
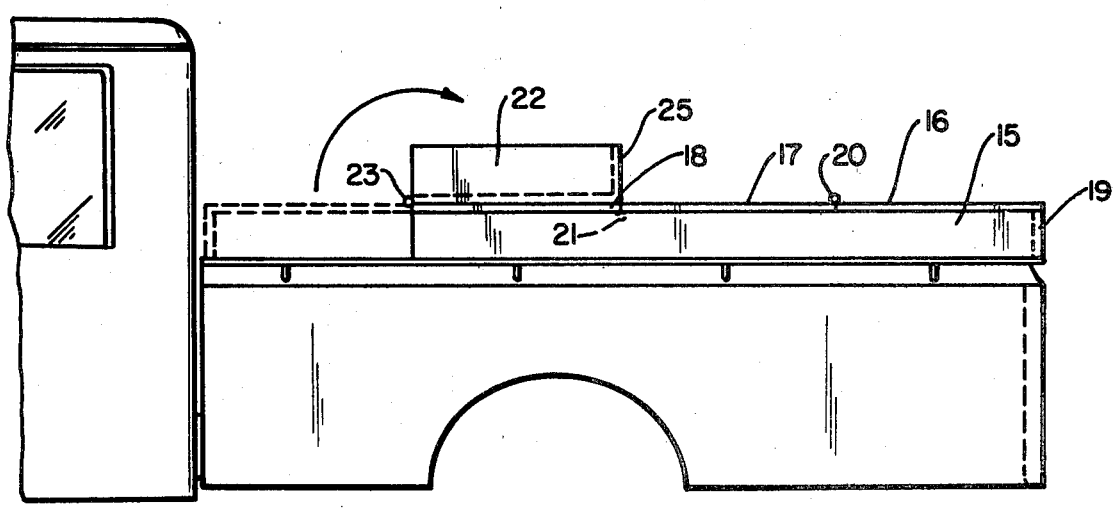

Access to the forward portion of the bed when the truck bed cover is in the closed position is accomplished by unlocking cover member 23 and folding said member upwardly and rearwardly about hinge 23 onto panel 18 as shown in FIG. 6 by the arrow.

Figure 7:
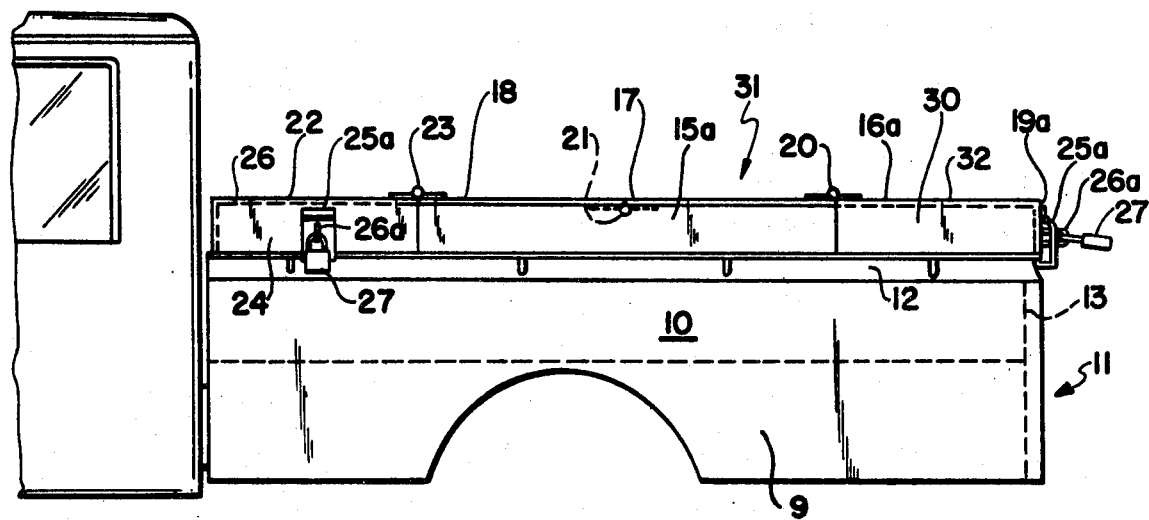
FIG. 7 shows a side view of another foldable cover of the invention mounted on the bed of a pick-up trunk.

Referring to FIG. 7, another embodiment of the truck bed cover of the invention is shown indicated generally by 31. Elements of the truck bed cover of FIG. 7 which are the same as that of FIGS. 1 through 6 are indicated by the same reference numeral. In this embodiment, the vertical support members 15a are mounted atop the rail section 12 on each side of the truck bed at the central portion thereof. The rear member 16a has the same construction as the forward cover member 22, that is it is a hollow box-like member having a pair of side walls 30, rearward vertical end wall 19a and a top wall 32. The rearward cover member provides a rearward enclosure of the truck bed, with the forward edges of sidewalls 30 abutting the rearward edges of support members 15a. Cover member 16a is hingedly connected to first central cover panel 17 by means of rearward top hinge 20 as in FIGS. 1–6. Means for locking the rear cover member 16a can be the same as that described in connection with FIGS. 1–6 above. Opening of this cover is accomplished in the same manner as the cover of FIGS. 1 & 2, as shown in FIGS. 3 to 6.

The entire cover including support members can be easily fabricated and installed and can be made of light weight materials such as wood, aluminum, plastic or fiberglass.

Figure 2:
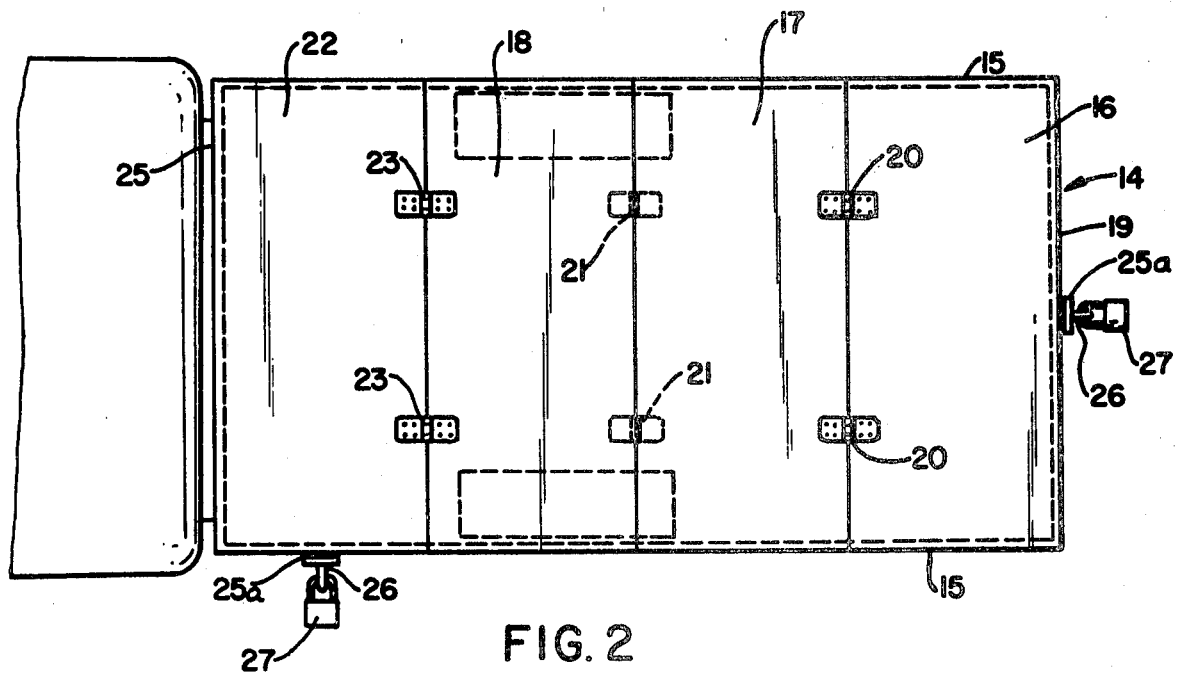
FIG. 2 is a top view of FIG. 1.

The truck bed cover of this invention offers several advantages. Firstly, in the closed position as shown in FIGS. 1 & 2 it protects the load or articles carried in the bed from weather and damage and can be easily locked to prevent unwarranted access to the bed. Secondly, its flat construction minimizes air resistance. Thirdly, and perhaps more importantly, it allows separate access to the rear and forward sections of the bed to retrieve or load articles from or to those sections while the remaining sections of the bed are protected from the weather or further access. The rearward and central portions of the bed are also allowed access while the forward portion is closed.

For example, in many cases the user of a truck may only desire to carry a single article such as a tool box. Using the cover of this invention the tool box can be stowed and locked under the forward or rear sections of the bed. With the cover in the closed position the box is protected from the weather and access. When it is desired to retrieve the tool box only the rear cover member or forward cover member need be opened depending on the location of the box. If a single article is to be carried together with additional bulk load as for example, wood, brick or packaging, the bulk load can be stowed in the central and rear sections and the single article in the forward section. By opening the forward cover member access to the single article can be achieved without exposing the bulk material to the weather. When it is desired to remove the bulk load the rear cover member and central cover panels can be folded to allow access to the central and rear sections of the bed while the single article remains covered. The cover can also convert the open truck bed to a partially open truck bed for carrying articles which are substantially taller than the bed. For example, a large item such as a refrigerator could be carried in the bed in the central and rear sections, that is with the cover of the invention in the position shown in FIG. 5. The forward cover member 22 will prevent movement of therefrigerator forwardly of the bed during braking of the vehicle.

Similarly a tall article such as file cabinet, for example can be carried in the rearward or forward section of the bed with the rear cover member or forward cover member folded as shown in FIGS. 3 to 6, respectively. If carried in the rearward section the vehicle end wall or tailgate and first central cover panel will prevent forward and rearward movement of the article. If carried in the forward section, the forward wall of the vehicle and second central cover panel will prevent forward and rearward movement of the article.

It should also be mentioned that the cover as shown in the Figures may be opened to provide access to the front and central sections of the bed whereby front cover member 22 is pivoted upwardly and rearwardly over cover panel 18, then pivoting panel 17 upwardly about hinge 20 and pivoting cover member 22 and panel 18 in combination downwardly about hinge 21 to form a folded combination of member 22, and panels 18 & 17 and then pivoting the folded combination dowardly and rearwardly atop rear cover member 16 or 16a about hinge 20.

I claim:

1. A foldable cover assembly for a vehicle having a pair of vehicle side walls and a vehicle end wall defining an open bed for carrying articles, said bed having a rear, central and forward section, wherein said cover comprises:
    (a) a pair of support members mounted lengthwise above each of said vehicle side walls and extending along the rear and central sections of said bed; each support member having a rearward and a forward edge;
    (b) a rear cover member extending across said support members at the rear section of said bed, said rear cover member having a vertical rear wall aubtting the rearward edges of said support members to enclose the rear section of said bed;
    (c) a first central cover panel extending across said support members adjacent said rear cover member, said first central cover panel pivotably connected to said rear cover member;
    (d) a second central cover panel extending across said support members adjacent said first central panel, said second central panel pivotably connected to said first central panel, said first and second central cover panels overlying said central section; and
    (e) a forward cover member enclosing the forward section of said bed having a pair of side walls and a forward end wall, said cover member pivotably connected to said second central panel, said pair of side walls abutting the forward edges of said support members and said forward end wall enclosing the forward section of said bed.

2. The cover assembly of claim 1 which further comprises means for locking said rear cover panel to said vehicle.

3. The cover assembly of claim 1 which further comprises means for locking said forward cover member to said vehicle.

4. A foldable cover assembly for a vehicle having a pair of vehicle side walls and a vehicle end wall defining an open bed for carrying articles, said bed having a rear, central and forward section, wherein said cover comprises:
    (a) a pair of support members mounted lengthwise above each of said vehicle side walls and extending along the rear and central sections of said bed, each support member having a rearward and a forward edge;
    (b) a rear cover member extending across said support members at the rear portion of said bed, said rear cover member having a vertical rear wall abutting the rearward edges of said support members to enclose the rear section of said bed;
    (c) a first central cover panel extending across said support members adjacent said rear cover panel;
    (d) a rearward top hinge connecting said rear cover panel and said first central cover panel;
    (e) a second central cover panel extending across said support members adjacent said first central cover panel;
    (f) a central lower hinge connecting said second central cover panel and said first cover member;
    (g) a forward cover member adjacent said second central cover panel enclosing the forward section of said bed having a pair of side walls and a forward end wall, said pair of side walls abutting the forward edges of said support members and said forward end wall enclosing the forward section of said bed;
    (h) a forward top hinge connecting said forward cover member and said second central cover panel;
    (i) means for locking said rear cover member to said vehicle; and
    (j) means for locking said forward cover member to said vehicle.

5. A foldable cover assembly for a vehicle having a pair of vehicle side walls and a vehicle end wall defining an open bed for carrying articles, said bed having a rear, central and forward section, wherein said cover comprises:
    (a) a pair of support members mounted lengthwise above each of said vehicle side walls and extending along the central section of said bed, each support member having a rearward and a forward edge;
    (b) a rear cover member enclosing the rear section of said bed having a pair of side walls abutting the rearward edges of said support member;
    (c) a first central cover panel extending across said support member adjacent said rear cover member, said first central cover panel pivotably connected to said rear cover member;
    (d) a second central cover panel extending across said support members adjacent said first central panel, said second central panel pivotably connected to said first central panel, said first and second central cover panels overlying said central section; and
    (e) a forward cover member enclosing the forward section of said bed having a pair of side walls abutting the forward edges of said support member and a forward end wall, said forward member pivotably connected to said second central panel.

6. The cover assembly of claim 5 which further comprises means for locking said rear cover member to said vehicle.

7. The cover assembly of claim 5 which further comprises means for locking said forward cover member to said vehicle.

8. A foldable cover assembly for a vehicle having a pair of vehicle side walls and a vehicle end wall defining an open bed for carrying articles, said bed having a rear, central and forward section, wherein said cover comprises:
    (a) a pair of support members mounted lengthwise above each of said vehicle side walls and extending along the central section of said bed, each support member having a rearward and a forward edge;

(b) a rear cover member enclosing the rear section of said bed having a pair of side walls abutting the rearward edges of said support members and a rearward end wall;

(c) a first central cover panel extending across said support members adjacent said rear cover member;

(d) a rearward top hinge connecting said rear cover member and said first central cover panel;

(e) a second central cover panel extending across said support members adjacent said first central cover panel;

(f) a central lower hinge connecting said second central cover panel and said first cover member;

(g) a forward cover member adjacent said second central cover panel enclosing the forward section of said bed having a pair of side walls abutting the forward edges of said support member and a forward end wall;

(h) a forward top hinge connecting said forward cover member and said second central cover panel;

(i) means for locking said rear cover panel to said vehicle; and (j) means for locking said forward cover member to said vehicle.

* * * * *